US012563468B2

(12) United States Patent
Thubert et al.

(10) Patent No.: US 12,563,468 B2
(45) Date of Patent: *Feb. 24, 2026

(54) INTER-PAN OPTIMIZATION BY CONTROLLER DEVICE REDIRECTING TARGET NETWORK DEVICES TO ATTACH TO SELECTED PARENT DEVICES

(71) Applicant: Cisco Technology, Inc., San Jose, CA (US)

(72) Inventors: Pascal Thubert, Roquefort les Pins (FR); Huimin She, Shanghai (CN); Li Zhao, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 787 days.

This patent is subject to a terminal disclaimer.

(21) Appl. No.: 17/747,649

(22) Filed: May 18, 2022

(65) Prior Publication Data
US 2023/0379782 A1 Nov. 23, 2023

(51) Int. Cl.
*H04W 36/22* (2009.01)
*H04W 28/086* (2023.01)
*H04W 60/06* (2009.01)

(52) U.S. Cl.
CPC ......... *H04W 36/22* (2013.01); *H04W 28/086* (2023.05); *H04W 60/06* (2013.01)

(58) Field of Classification Search
CPC ... H04W 36/22; H04W 28/086; H04W 60/06; H04W 24/02; H04W 60/04
See application file for complete search history.

(56) References Cited

U.S. PATENT DOCUMENTS

| 8,934,366 B2 | 1/2015 | Hui et al. |
| 9,565,108 B2 | 2/2017 | Hui et al. |
| 9,935,868 B2 | 4/2018 | Hui et al. |
| 10,609,621 B2 | 3/2020 | Yang et al. |
| 2010/0202357 A1* | 8/2010 | Kim .................... H04L 63/0892 |
| | | 370/328 |

(Continued)

OTHER PUBLICATIONS

Farag et al., "Congestion-Aware Routing in Dynamic IoT Networks: A Reinforcement Learning Approach", May 20, 2021, [online], [retrieved on Oct. 22, 2021]. Retrieved from the Internet: URL: <https://arxiv.org/pdf/2105.09678.pdf>, 6 pages.

(Continued)

*Primary Examiner* — Ricky Q Ngo
*Assistant Examiner* — Kabir U Jahangir
(74) *Attorney, Agent, or Firm* — Lee & Hayes, P.C.

(57) ABSTRACT

In one embodiment, a method comprises: determining, by a controller device, load attributes for respective wireless network devices in a data network comprising at least a first wireless data network rooted by a first root network device, each wireless network device attached to at least an identified parent network device; identifying, by the controller device based on at least a subset of the load attributes, that at least one targeted device among the wireless network devices needs to migrate to a different parent network device in the data network; and causing, by the controller device, the targeted device to detach from its identified parent network device and attach to the different parent network device based on generating and outputting an individual attachment directive destined for the targeted device.

20 Claims, 10 Drawing Sheets

(56) References Cited

U.S. PATENT DOCUMENTS

| | | | | |
|---|---|---|---|---|
| 2011/0231573 | A1* | 9/2011 | Vasseur | H04L 45/48 709/238 |
| 2013/0279365 | A1* | 10/2013 | Hui | H04L 45/033 370/252 |
| 2014/0204759 | A1 | 7/2014 | Guo et al. | |
| 2014/0222730 | A1* | 8/2014 | Vasseur | G06F 11/3433 706/12 |
| 2015/0332165 | A1* | 11/2015 | Mermoud | G06N 5/048 706/12 |
| 2016/0134468 | A1* | 5/2016 | Hui | H04L 45/02 709/224 |
| 2017/0078170 | A1 | 3/2017 | Vasseur et al. | |
| 2018/0167314 | A1 | 6/2018 | Kim et al. | |
| 2018/0331940 | A1 | 11/2018 | Jadhav et al. | |
| 2019/0394737 | A1* | 12/2019 | Luo | H04W 48/18 |
| 2020/0162944 | A1 | 5/2020 | Barton et al. | |
| 2021/0320809 | A1 | 10/2021 | Thubert et al. | |
| 2021/0352008 | A1 | 11/2021 | Maallem et al. | |

OTHER PUBLICATIONS

Richardson et al., "Controlling Secure Network Enrollment in RPL networks", ROLL Working Group, Internet-Draft, Aug. 9, 2021, [online], [retrieved on Dec. 30, 2021]. Retrieved from the Internet: UTL: <draft-ietf-roll-enrollment-priority-05.pdf>, pp. 1-9.

She et al., "Location-Aware Personal Area Network Migration for Lowpower and Lossy Networks", Cisco 2017, IP.com No. IPCOM000251158D, Oct. 19, 2017, 5 pages.

Chen et al., "Service-Aware Node Migration for Low-Power and Lossy Networks", Cisco 2017, IP.Com No. IPCOM000251469D, Nov. 2, 2017, 15 pages.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Mar. 29, 2018]. Retrieved from the Internet: URL: <https://tools.ietf.org/pdf/rfc6550.pdf>, pp. 1-157.

Sebastian et al., "Load Balancing Optimization for RPL Based Emergency Response Using Q-Learning", International Journal of Science and Technology, Aug. 23, 2018, [online], [retrieved on Oct. 22, 2021]. Retrieved from the Internet: URL: <https://pdfs.semanticscholar.org/58c3/8b3c6eef9cb9ba1bf41052345f60c8487f9d.pdf>, pp. 74-92 (19 pages).

Thubert, Ed., et al., Root initiated routing state in RPL, ROLL Internet Draft, Mar. 23, 2022, [online], [retrieved on Apr. 20, 2022]. Retrieved from the Internet: URL: <https://datatracker.ietf.org/doc/draft-ietf-roll-dao-projection>, pp. 1-84.

Kim et al., "QU-RPL: Queue Utilization based RPL for Load Balancing in Large Scale Industrial Applications", 2015 12th Annual IEEE International Conference on Sensing, Communication, and Networking (SECON), 2015 IEEE, Nov. 30, 2015, pp. 265-273.

Thubert et al., U.S. Appl. No. 17/671,712, filed Feb. 15, 2022.

* cited by examiner

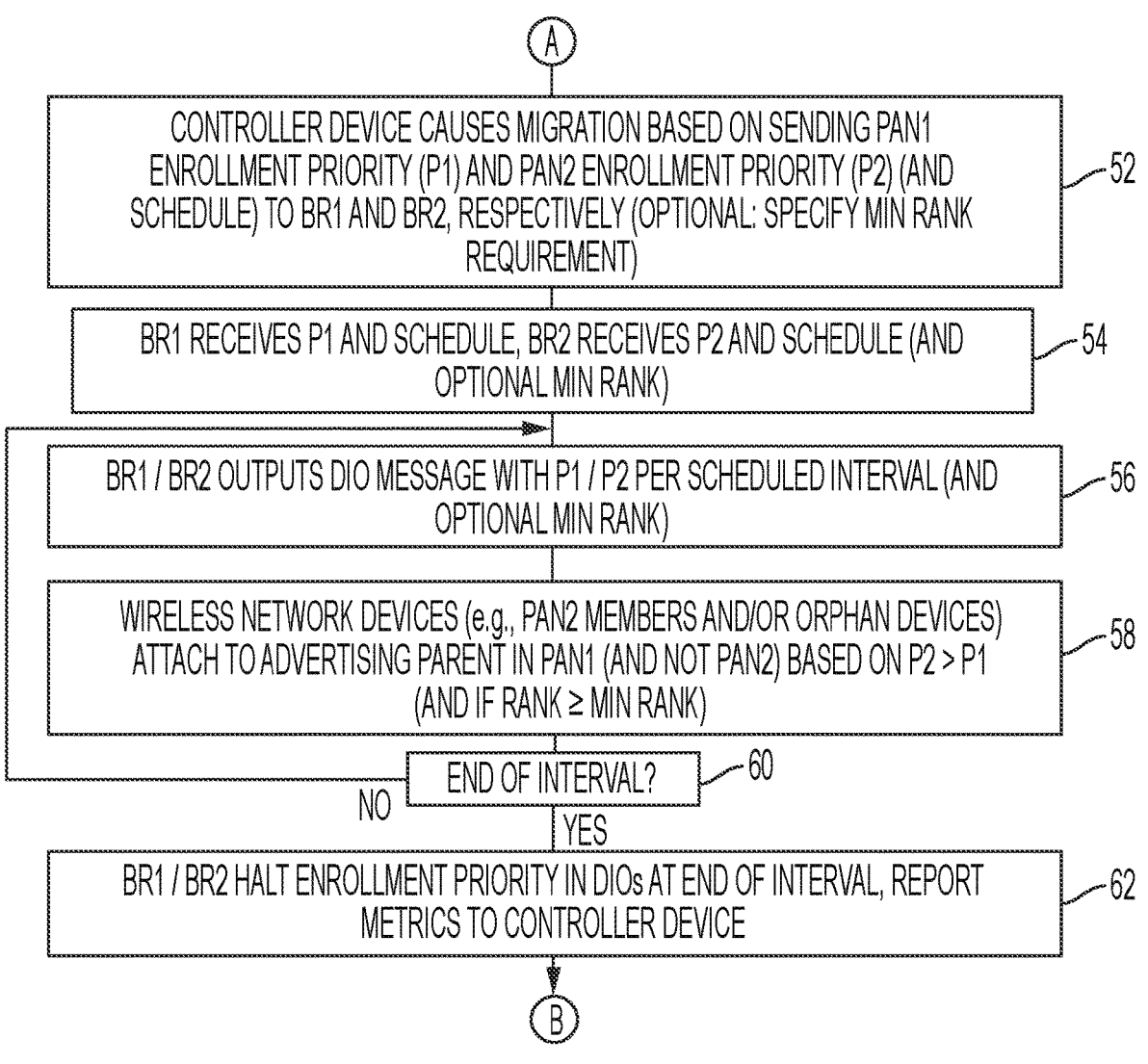

Ⓐ

CONTROLLER DEVICE CAUSES MIGRATION BASED ON SENDING PAN1 ENROLLMENT PRIORITY (P1) AND PAN2 ENROLLMENT PRIORITY (P2) (AND SCHEDULE) TO BR1 AND BR2, RESPECTIVELY (OPTIONAL: SPECIFY MIN RANK REQUIREMENT) ⌐52

BR1 RECEIVES P1 AND SCHEDULE, BR2 RECEIVES P2 AND SCHEDULE (AND OPTIONAL MIN RANK) ⌐54

BR1 / BR2 OUTPUTS DIO MESSAGE WITH P1 / P2 PER SCHEDULED INTERVAL (AND OPTIONAL MIN RANK) ⌐56

WIRELESS NETWORK DEVICES (e.g., PAN2 MEMBERS AND/OR ORPHAN DEVICES) ATTACH TO ADVERTISING PARENT IN PAN1 (AND NOT PAN2) BASED ON P2 > P1 (AND IF RANK ≥ MIN RANK) ⌐58

END OF INTERVAL? ⌐60

NO          YES

BR1 / BR2 HALT ENROLLMENT PRIORITY IN DIOs AT END OF INTERVAL, REPORT METRICS TO CONTROLLER DEVICE ⌐62

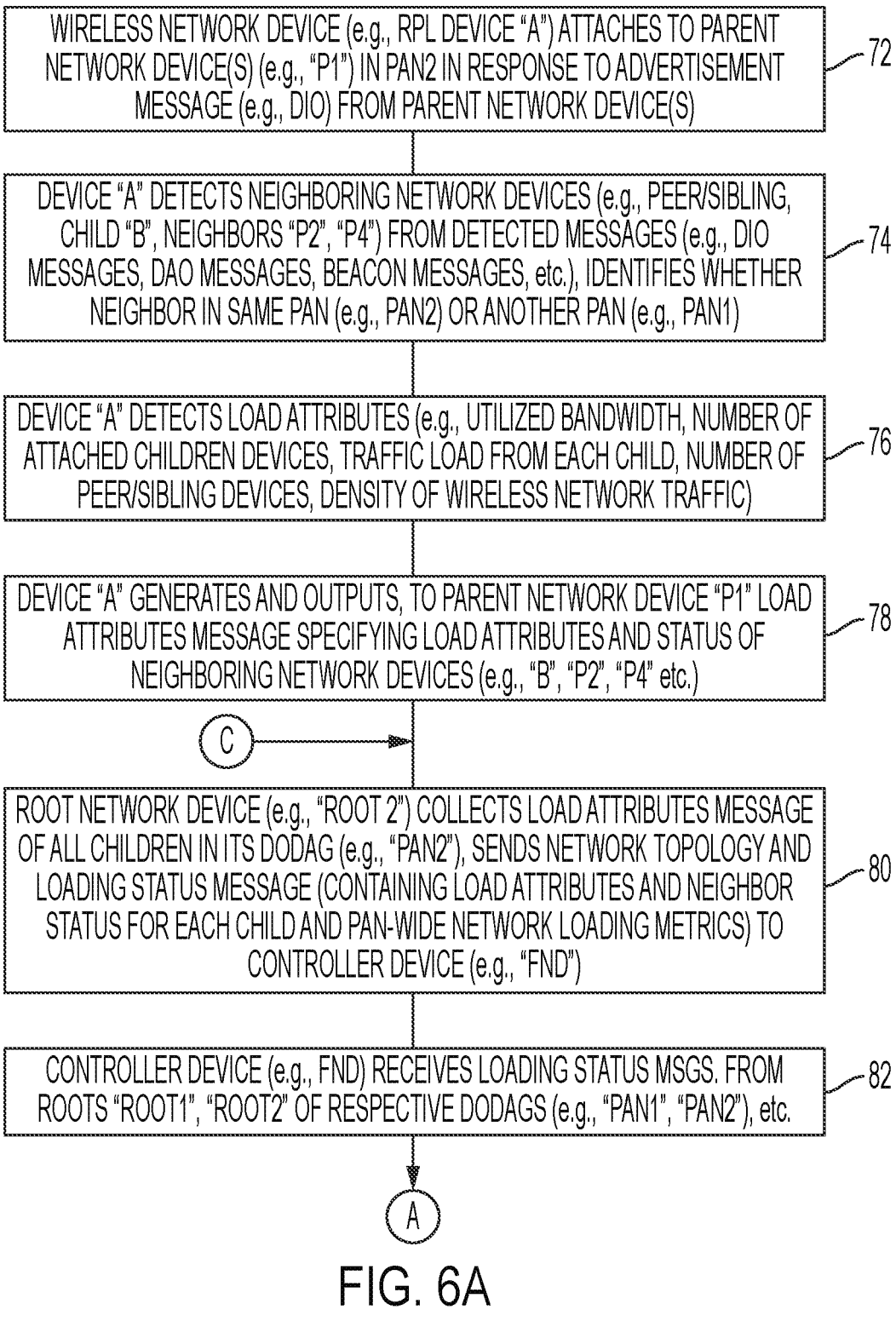

WIRELESS NETWORK DEVICE (e.g., RPL DEVICE "A") ATTACHES TO PARENT NETWORK DEVICE(S) (e.g., "P1") IN PAN2 IN RESPONSE TO ADVERTISEMENT MESSAGE (e.g., DIO) FROM PARENT NETWORK DEVICE(S) — 72

DEVICE "A" DETECTS NEIGHBORING NETWORK DEVICES (e.g., PEER/SIBLING, CHILD "B", NEIGHBORS "P2", "P4") FROM DETECTED MESSAGES (e.g., DIO MESSAGES, DAO MESSAGES, BEACON MESSAGES, etc.), IDENTIFIES WHETHER NEIGHBOR IN SAME PAN (e.g., PAN2) OR ANOTHER PAN (e.g., PAN1) — 74

DEVICE "A" DETECTS LOAD ATTRIBUTES (e.g., UTILIZED BANDWIDTH, NUMBER OF ATTACHED CHILDREN DEVICES, TRAFFIC LOAD FROM EACH CHILD, NUMBER OF PEER/SIBLING DEVICES, DENSITY OF WIRELESS NETWORK TRAFFIC) — 76

DEVICE "A" GENERATES AND OUTPUTS, TO PARENT NETWORK DEVICE "P1" LOAD ATTRIBUTES MESSAGE SPECIFYING LOAD ATTRIBUTES AND STATUS OF NEIGHBORING NETWORK DEVICES (e.g., "B", "P2", "P4" etc.) — 78

C →

ROOT NETWORK DEVICE (e.g., "ROOT 2") COLLECTS LOAD ATTRIBUTES MESSAGE OF ALL CHILDREN IN ITS DODAG (e.g., "PAN2"), SENDS NETWORK TOPOLOGY AND LOADING STATUS MESSAGE (CONTAINING LOAD ATTRIBUTES AND NEIGHBOR STATUS FOR EACH CHILD AND PAN-WIDE NETWORK LOADING METRICS) TO CONTROLLER DEVICE (e.g., "FND") — 80

CONTROLLER DEVICE (e.g., FND) RECEIVES LOADING STATUS MSGS. FROM ROOTS "ROOT1", "ROOT2" OF RESPECTIVE DODAGS (e.g., "PAN1", "PAN2"), etc. — 82

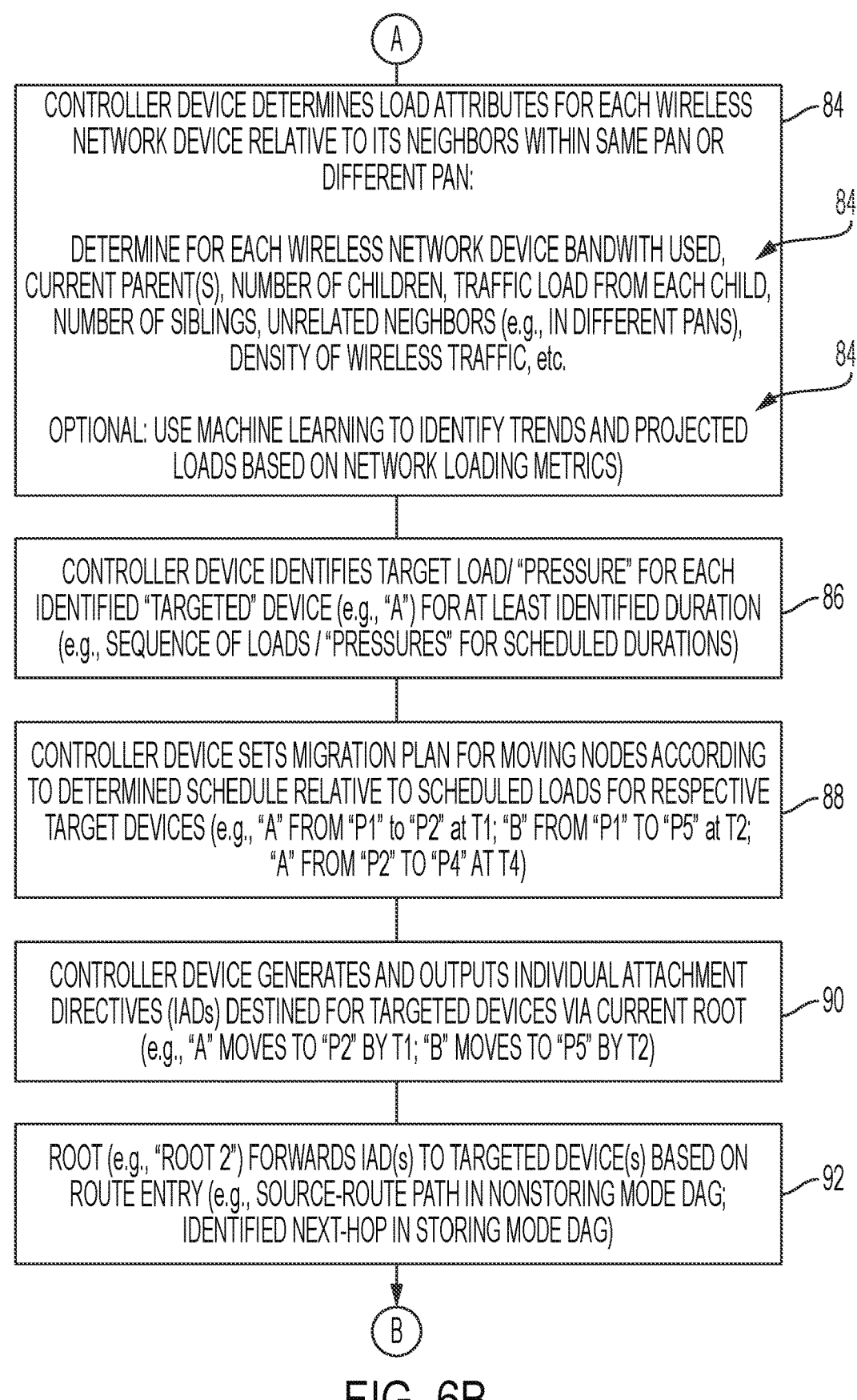

A

CONTROLLER DEVICE DETERMINES LOAD ATTRIBUTES FOR EACH WIRELESS NETWORK DEVICE RELATIVE TO ITS NEIGHBORS WITHIN SAME PAN OR DIFFERENT PAN:

DETERMINE FOR EACH WIRELESS NETWORK DEVICE BANDWITH USED, CURRENT PARENT(S), NUMBER OF CHILDREN, TRAFFIC LOAD FROM EACH CHILD, NUMBER OF SIBLINGS, UNRELATED NEIGHBORS (e.g., IN DIFFERENT PANS), DENSITY OF WIRELESS TRAFFIC, etc.

OPTIONAL: USE MACHINE LEARNING TO IDENTIFY TRENDS AND PROJECTED LOADS BASED ON NETWORK LOADING METRICS)

— 84

— 84a

— 84b

CONTROLLER DEVICE IDENTIFIES TARGET LOAD/ "PRESSURE" FOR EACH IDENTIFIED "TARGETED" DEVICE (e.g., "A") FOR AT LEAST IDENTIFIED DURATION (e.g., SEQUENCE OF LOADS / "PRESSURES" FOR SCHEDULED DURATIONS)

— 86

CONTROLLER DEVICE SETS MIGRATION PLAN FOR MOVING NODES ACCORDING TO DETERMINED SCHEDULE RELATIVE TO SCHEDULED LOADS FOR RESPECTIVE TARGET DEVICES (e.g., "A" FROM "P1" to "P2" at T1; "B" FROM "P1" TO "P5" at T2; "A" FROM "P2" TO "P4" AT T4)

— 88

CONTROLLER DEVICE GENERATES AND OUTPUTS INDIVIDUAL ATTACHMENT DIRECTIVES (IADs) DESTINED FOR TARGETED DEVICES VIA CURRENT ROOT (e.g., "A" MOVES TO "P2" BY T1; "B" MOVES TO "P5" BY T2)

— 90

ROOT (e.g., "ROOT 2") FORWARDS IAD(s) TO TARGETED DEVICE(s) BASED ON ROUTE ENTRY (e.g., SOURCE-ROUTE PATH IN NONSTORING MODE DAG; IDENTIFIED NEXT-HOP IN STORING MODE DAG)

Figure 6C:
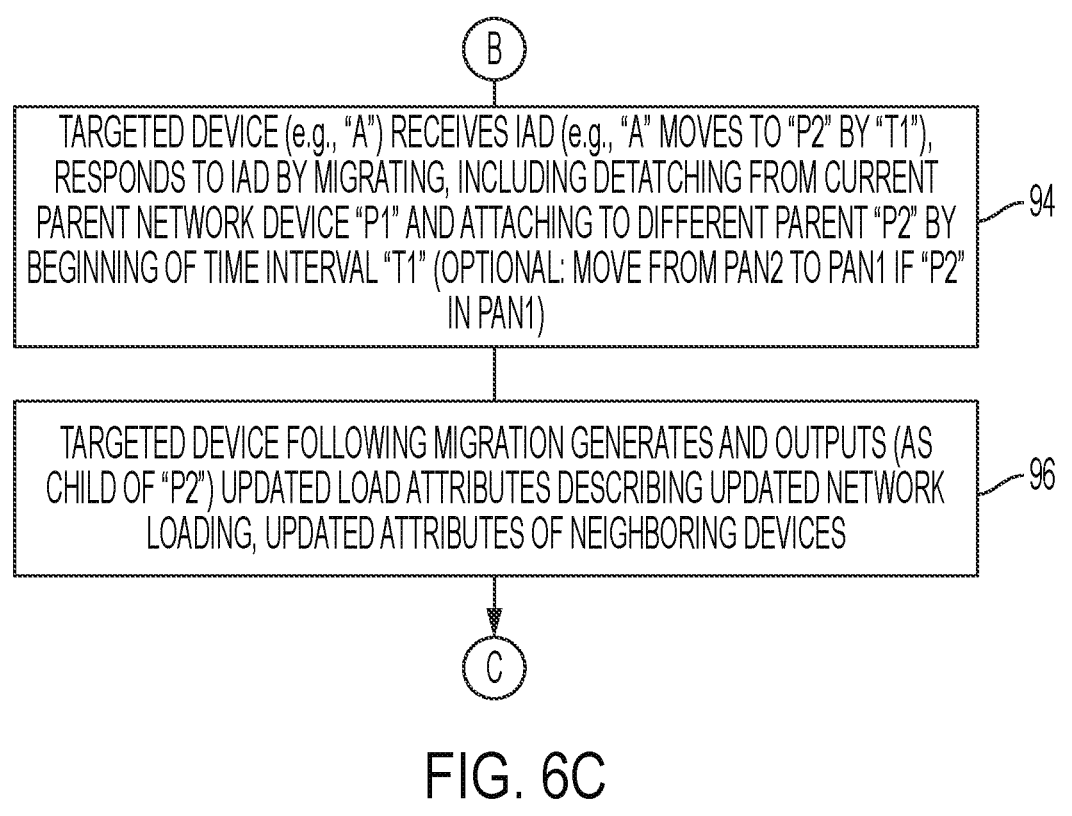

TARGETED DEVICE (e.g., "A") RECEIVES IAD (e.g., "A" MOVES TO "P2" BY "T1"), RESPONDS TO IAD BY MIGRATING, INCLUDING DETATCHING FROM CURRENT PARENT NETWORK DEVICE "P1" AND ATTACHING TO DIFFERENT PARENT "P2" BY BEGINNING OF TIME INTERVAL "T1" (OPTIONAL: MOVE FROM PAN2 TO PAN1 IF "P2" IN PAN1) —94

TARGETED DEVICE FOLLOWING MIGRATION GENERATES AND OUTPUTS (AS CHILD OF "P2") UPDATED LOAD ATTRIBUTES DESCRIBING UPDATED NETWORK LOADING, UPDATED ATTRIBUTES OF NEIGHBORING DEVICES —96

DEVICE INTERFACE CIRCUIT ~30

PROCESSOR CIRCUIT
(E.G., MICROPROCESSOR CIR., MULTI-PROCESSOR CORE CIR., ASIC,ETC.) ~32

MEMORY CIRCUIT ~34

INTER-PAN OPTIMIZATION BY CONTROLLER DEVICE REDIRECTING TARGET NETWORK DEVICES TO ATTACH TO SELECTED PARENT DEVICES

TECHNICAL FIELD

The present disclosure generally relates to Inter-Personal Area Network (PAN) optimization by a controller device redirecting target network devices to attach to selected parent devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks: such low-power router devices can be referred to as LLN devices, or "RPL nodes" in the case of low-power router devices utilizing the Routing Protocol for Low Power and Lossy Networks (RPL) as described in the Internet Engineering Task Force (IETF) Request for Comments (RFC) 6550, "RPL: IPv6 Routing Protocol for Low-Power and Lossy Networks". Each LLN node in the LLN typically is constrained by processing power, memory, and energy (e.g., battery power); interconnecting wireless links between the LLN nodes typically are constrained by high loss rates, low data rates, and instability with relatively low packet delivery rates. A network topology (e.g., a "RPL instance") can be established based on creating routes in the form of a directed acyclic graph (DAG) toward a single "root" network device, also referred to as a "DAG root" or a "DAG destination". Hence, the DAG also can be referred to as a Destination Oriented DAG (DODAG). Network traffic moves either "up" towards the DODAG root or "down" towards the DODAG leaf nodes.

The Wi-SUN (Wireless Smart Utility Networks) alliance provides an interoperable wireless standards-based solution mainly for utility applications, such as distribution automation (DA). This kind of wireless data network is usually composed by multiple PANs (Personal Area Networks). Each PAN includes a border router (BR) as the root network device and hundreds of wireless network nodes, forming a corresponding multi-hop wireless mesh network (also called a Low Power and Lossy Network). The wireless network nodes are connected through wireless links. The data network is managed by a Field Network Director (FND) which is located at a remote site (e.g., via a Wide Area Network)

An unbalanced network can cause packet loss due to congestion, low bandwidth etc. Therefore, in an ideal LLN, nodes should be evenly distributed to different PANs. Arbitrary rebalancing techniques, however, still can result in suboptimal topologies that adversely affect the RPL nodes in the DODAG.

BRIEF DESCRIPTION OF THE DRAWINGS

Reference is made to the attached drawings, wherein elements having the same reference numeral designations represent like elements throughout and wherein:

FIGS. 3A-3B illustrate an example method by the controller device of FIG. 1 providing balancing between wireless data networks based on allocating enrollment priority values, according to an example embodiment.

FIGS. 6A-6C illustrates the controller device causing migration of targeted devices based on identifying load attributes for the wireless network devices, and sending individual attachment directives to the targeted devices, according to an example embodiment.

DESCRIPTION OF EXAMPLE EMBODIMENTS

Figure 1:
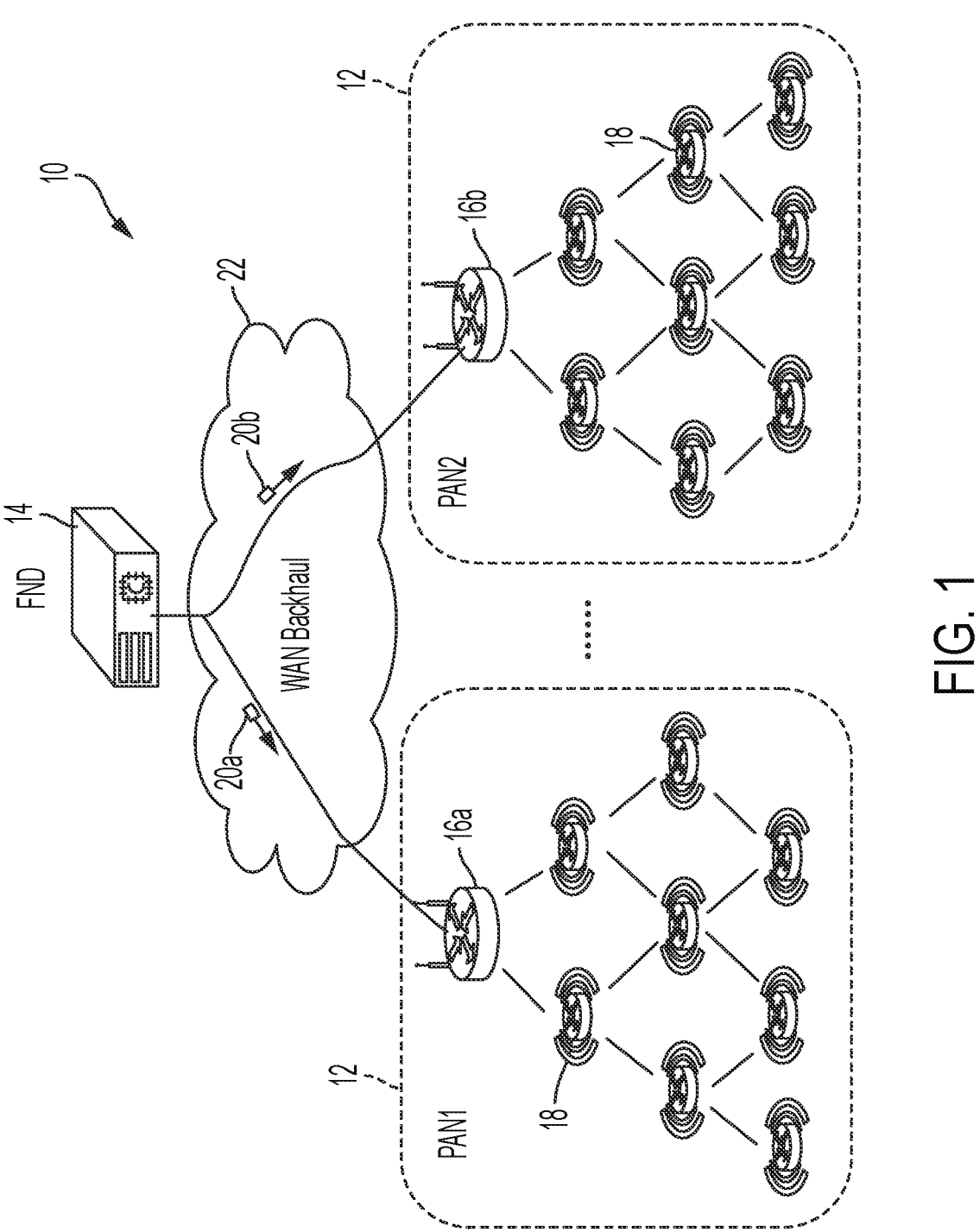
FIG. 1 illustrates an example data network (e.g., a Wi-SUN network) comprising multiple wireless data networks, each comprising a border router and wireless network devices, and the data network further comprising a controller device configured for providing balancing between the wireless data networks based on sending individual attachment directives to targeted devices in the wireless data networks, according to an example embodiment.

In one embodiment, a method comprises: determining, by a controller device, load attributes for respective wireless network devices in a data network comprising at least a first wireless data network rooted by a first root network device, each wireless network device attached to at least an identified parent network device; identifying, by the controller device based on at least a subset of the load attributes, that at least one targeted device among the wireless network devices needs to migrate to a different parent network device in the data network; and causing, by the controller device, the targeted device to detach from its identified parent network device and attach to the different parent network device based on generating and outputting an individual attachment directive destined for the targeted device.

In another embodiment, one or more non-transitory tangible media are encoded with logic for execution by a machine and when executed by the machine operable for: determining, by the machine implemented as a controller device, load attributes for respective wireless network devices in a data network comprising at least a first wireless data network rooted by a first root network device, each wireless network device attached to at least an identified parent network device; identifying, based on at least a subset of the load attributes, that at least one targeted device among the wireless network devices needs to migrate to a different parent network device in the data network; and causing the targeted device to detach from its identified parent network device and attach to the different parent network device based on generating and outputting an individual attachment directive destined for the targeted device.

In another embodiment, an apparatus is implemented as a physical machine and comprises: non-transitory machine readable media configured for storing executable machine readable code; a device interface circuit; and a processor circuit. The processor circuit is configured for executing the machine readable code, and when executing the machine readable code operable for: determining, by the apparatus implemented as a controller device, load attributes for respective wireless network devices in a data network comprising at least a first wireless data network rooted by a first root network device, each wireless network device attached to at least an identified parent network device; identifying, based on at least a subset of the load attributes, that at least one targeted device among the wireless network devices needs to migrate to a different parent network device in the data network; and causing the targeted device to detach from its identified parent network device and attach to the different parent network device based on generating and outputting an individual attachment directive destined for the targeted device.

In another embodiment, a method comprises: attaching, by a wireless network device, to a parent network device of a first wireless data network in response to receiving an advertisement message from the parent network device; generating and outputting to the parent network device, by the wireless network device, load attributes describing network loading encountered by the wireless network device and detected attributes of neighboring wireless network devices; receiving, by the wireless network device, an individual attachment directive addressed to the wireless network device, the individual attachment directive directing the wireless network device to migrate to a different parent network device identified in the individual attachment directive; and responding to the individual attachment directive based on migrating to the different parent network device, including detaching from the parent network device and attaching to the different parent network device.

DETAILED DESCRIPTION

Particular embodiments enable balancing between multiple wireless data networks implemented, for example, as personal area networks (PANs) or Destination Oriented Directed Acyclic Graphs (DODAGs), where a controller device can provide inter-PAN (or inter-DODAG) node balancing based on sending individual attachment directives to targeted devices via root network devices of the respective wireless data networks.

Commonly-assigned, copending application Ser. No. 17/671,712, filed Feb. 15, 2022, entitled "INTER-PAN LOAD/SIZE BALANCING CONTROLLED BY ENROLLMENT PRIORITY IN LLNS", describes inter-PAN balancing based on sending different enrollment priorities to respective root network devices of different PANs. In particular, the Internet Engineering Task Force (IETF) Draft by Richardson et al, "Controlling Secure Network Enrollment in RPL networks" (draft-ietf-roll-enrollment-priority-05) (hereinafter "IETF draft by Richardson et al.") describes how a root network device can place a value called minimum enrollment priority in a Destination Oriented Directed Acyclic Graph (DODAG) Information Object (DIO) message that is flooded down the DODAG. This minimum enrollment priority indicates a relative desirability by the root network device to "grow" the DODAG (or not) with additional wireless network devices that attach to the DODAG. Use of DIO messages to build a DODAG are described in further detail, for example, in the IETF RFC 6550. Wireless routers can then increase that value to expose to the nodes the desirability to join.

The copending application Ser. No. 17/671,712 describes how a controller device can cause balancing between wireless data networks based on the controller device determining a load for each wireless data network, determining that network devices need to migrate, and sending enrollment priority values to the root network devices of the respective wireless data networks. The enrollment priority values allocated by the controller device can cause the root network devices to advertise the enrollment priority values that cause network devices to migrate to a wireless data network based on the enrollment priority values.

The example embodiments described herein provide improved control and precision in balancing between wireless data networks based on the controller device identifying, from the load attributes, that at least one targeted device needs to migrate to a different parent network device. The controller device can generate and output an individual attachment directive that identifies the targeted device and specifies an instruction for the targeted device to attach to a different parent network device. The controller device can output the individual attachment directive to the root network device providing reachability to the targeted device, enabling the root network device to unicast transmit the individual attachment directive to the targeted device via its current parent network device.

Hence, the targeted device can detach from its current parent network device and attach to a different parent network device in response to receiving the individual attachment directive. The different parent network device can be within the same PAN or a different PAN. The individual attachment directive also can identify a schedule or time instance that causes the targeted device to migrate to the different parent network device by the specified time instance.

Hence, the example embodiments enable a controller device to implement precise migration operations by targeted network devices, for example according to a determined schedule established by the controller device. The controller device can cause a targeted network device to migrate to a first parent network device for a first identified duration relative to a determined schedule, that enables the targeted network device to operate according to a determined target load determined by the controller device.

The controller device can implement the example embodiments for inter-PAN optimization on a per-network device basis, or in combination with the rebalancing using differing enrollment priorities described in copending application Ser. No. 17/671,712 in order to provide a combination of "coarse tuning" rebalancing using the different enrollment priorities, and "fine tuning" rebalancing for optimization of the different PANs based on detected target loads for targeted network devices.

FIG. 1 illustrates an example physical data network 10, for example a Wi-SUN network 10 comprising multiple wireless data networks "PAN1", "PAN2" 12 implemented for example as Personal Area Networks (PANs), and a controller device 14. Each PAN 12 comprises a border router device 16 (also referred to herein as a root network device) and wireless network devices 18, for example Internet of Things (IoT) devices. The controller device 14, also referred to as a Field Network Director (FND) device 14, is configured for providing Inter-PAN Load/Size Balancing and inter-PAN optimization.

The controller device 14 can be configured for executing "unicast-based optimization" of the PANs (e.g., "PAN1", "PAN2", etc.) 12 based on generating and outputting, for unicast transmission by a root network device 16, an individual attachment directive (70 of FIG. 5) that causes a targeted device (e.g., "A") 18 to migrate based on detaching from its identified parent network device (e.g., "P1" of FIG. 5) and attaching to a different parent network device (e.g., "P2" of FIG. 5) identified in the individual attachment directive 70. As described in copending application Ser. No. 17/671,712, the controller device 14 also can execute a "broadcast-based optimization" of the PANs based on allocating, to each border router device 16, a corresponding enrollment priority 20 for broadcast transmission by the border router device 16. As described below, each individual attachment directive 70 and/or each enrollment priority 20 can be transmitted, by the controller device 14, to a corresponding destination border router device 16 via a local and/or wide area network (WAN) 22.

The example embodiments address the following inter-DODAG balancing problem: it is very difficult for a root network device 16 to select an enrollment priority value that will result in balanced DODAGs (e.g., "PAN1" and "PAN2" in FIG. 1), where "balancing" can be based on various loading metrics such as size of a PAN 12 in number of nodes, or the load in throughput, etc. For example, a border router device 16a can increase an enrollment priority upon detecting load saturation in the corresponding "PAN1" 12, however the border router device 16a cannot determine the effect of changing the enrollment priority. Consequently, the increase in enrollment priority by a border router device 16a in a PAN (e.g., "PAN1") 12 can cause ("push") saturation onto the next adjacent DODAGs (e.g., "PAN2") 12, creating oscillations in saturations between the PANs "PAN1" and "PAN2", as each border router device 16a and 16b attempts to successively increase enrollment priority to mitigate load saturation. Hence, attempts at controlling enrollment priority as a distributed protocol can result in oscillations in load saturations between neighboring PANs 12. Algebra-based attempts do not solve the problem.

Prior attempts to rebalance the DAGs in a distributed fashion also never really solved the problem of oscillating saturations. At best, oscillations were limited with dampening. Examples of the distributed attempts include: U.S. Pat. Nos. 8,934,366 and 9,565,108 proposed to use distributed node migration to balance the load across different LLN interfaces. In order to prevent the "herding" problem, it devised a weighted coin-toss process based on the proportional difference of the NetSize, Weight, and TrafficRate parameter.

Another attempt included using adaptive switch hold time instead of a constant one to avoid oscillation or delayed convergence, which is calculated based on the network depth NetDepth and Beta parameter. Besides, explicit leave notification is introduced to speed up migration process.

Another attempt challenged the fact that node migration easily becomes a critical bottleneck of LLN service, and provides a service-friendly solution that allows nodes to migrate between PANs with awareness of service quality, reliability, and availability.

Another attempt proposed a location-aware PAN migration strategy. The devices during migration select the PAN mainly based on the physical location of the field area router (FAR) operating as a root network device. The PAN size and rank are used as auxiliary information. It can mitigate the slow convergence problem and greatly accelerate the migration process. None of the above attempts, however, solved the problem of mitigating saturation without creating oscillations between wireless data networks.

Hence, use of enrollment priority to mitigate saturation without introducing oscillations between wireless data networks cannot be accomplished without providing coordination between adjacent root network devices 16a and 16b.

Moreover, different network devices 18 can have different operation modes depending on real-life events encountered by the network devices 18. For example, an IoT device 18 may have a relatively "quiet" low power operational status due to relatively few events requiring execution of any network-based operations by the IoT device (e.g., no sensor data to send to its root network device 16); in some cases, however, an unanticipated real-life event (e.g., a fire, flood, etc.) may require an IoT device 18 to initiate transmission of data streams requiring a high quality of service (e.g., a video stream of the fire, flood, etc.). Hence, instances may arise where an IoT device 18 may require optimized connections for more reliable delivery of QoS-sensitive data packets in a PAN 12.

The example embodiments can rebalance PAN loads and optimize PAN topologies for targeted PAN loads, without the adverse effects of oscillating saturations between PANs 12 and without the necessity of algebra-based compute solutions (that appear to approach NP difficulty), based on the example embodiments centralizing the selection of node migration (including using "unicast" based individual attachment directives or "broadcast" based enrollment priorities) at a controller node 14, illustrated in FIGS. 1 and 4-9. As described in further detail below, the controller device 14, implemented for example as a Wi-SUN FND, can be configured to supply individual attachment directives 70 and/or selected values of enrollment priorities 20 to selected root network devices 16 for selected time intervals in a selected sequence.

In particular, the example embodiments are based on executing balancing between PANs 12 based on the controller device 14 causing by migration from a loaded PAN (e.g., "PAN2") 12 to one or more neighboring PANs having less loads, or at least from a loaded subDAG parent (e.g., "P1" in "PAN2" 12 of FIG. 5) to a neighboring alternate subDAG parent (e.g., "P3" 12 of FIG. 5) in the same PAN 12. The example embodiments can execute balancing between the PANs based on a combination of unicast based optimization (based on generating and outputting individual attachment directives 70 to respective targeted devices 18) and broadcast based optimization (based on outputting of zero or more differing enrollment priorities among the PAN 12).

Each wireless data network (e.g., "PAN1", "PAN2") 12 can be implemented as an Internet Protocol version 6 (IPv6) wireless radio frequency (RF) mesh network, deployed for example using wireless link layer protocols such as IEEE 802.15.4e, IEEE 802.15.4g (referred to herein as "IEEE 802.15.4e/g"), and/or IEEE 802.15.5. In particular, each PAN 12 can be implemented as a smart grid Advanced Metering Infrastructure (AMI) network that can utilize a connected grid mesh (CG-Mesh) that comprises a field area router (FAR) 16 implemented as a root network device (e.g., "Root 1") and thousands of LLN devices 18, where each LLN device 18 can possibly reach, within its transmission range of its corresponding wireless data link, hundreds of neighboring LLN devices 18. The root network device (e.g., "Root 1") 16 can be implemented, for example, based on a commercially-available Cisco® Connected Grid Router (CGR) such as the CGR 1000 Series, commercially available from Cisco Systems, San Jose, California, modified as described herein. Hence, the root network device 16 also is referred to as a CGR, a DAG root, a DODAG root, or a root network device "CGR".

The root network device (e.g., "Root 1") 16 is configured for establishing, within the PAN 12, a "Personal Area Network" (PAN) having prescribed PAN identifier (e.g., "PAN 1"). The root network device (e.g., "Root 1") 16 also is configured for generating a DAG-based topology for the PAN based on outputting multicast DODAG information object (DIO) messages, for example according to RFC 6550, enabling the wireless network devices 18 to establish a DODAG rooted at the root network device (e.g., "Root 1") 16.

The wireless network devices 18 can be deployed, as part of an AMI network, within an urban environment as wireless outdoor devices (e.g., "poletop") devices deployed for forwarding network traffic to and from the root network device (e.g., "Root 1") 16.

Each wireless RPL network device 18 in the wireless data network 10 normally can join a DODAG 12 in response to receiving a multicast message (e.g., 36a, 36b of FIG. 4) such as a DIO message via wireless data links (i.e., under normal wireless conditions providing reliable wireless data links). Each wireless mesh network device 18 can be implemented as a constrained network device, or "LLN device" or "CG-mesh" device, configured for operating for example as a RPL node according to RFC 6550.

Each "child" network device (e.g., "A") 18 detecting the multicast DIO message output by the root network device (e.g., "Root 1" 16a) can select the root network device (e.g., "Root 1" 16a) as a parent in the identified DODAG (e.g., "PAN1") 12 based on comparing network topology metrics (advertised in the multicast DIO message) to a prescribed objective function of the RPL instance. The "child" network device (e.g., "A") 18, upon attaching to its parent, can output its own updated multicast DIO message with updated network topology metrics (e.g., rank identifier "Rank 1") that enable other wireless mesh network devices 18 to discover the DODAG 12, learn the updated network topology metrics, and select a DODAG parent. Hence, the network devices 18 can join the DODAG 12 in response to receiving a multicast DIO message from an advertising DODAG parent device, and selecting the DODAG parent as a default route.

Downward routes (i.e., away from the DAG root) 12 can be created based on unicast Destination Advertisement Object (DAO) messages that are created by a wireless mesh network device 18 and unicast transmitted to the DAG root 16. In non-storing mode the RPL nodes 18 do not store downward routing tables, hence a RPL node 18 unicasts its DAO message to the DAG root 16, such that all data packets are sent to the DAG root 16 and routed downward with source routes inserted by the DAG root 16.

Figure 7:
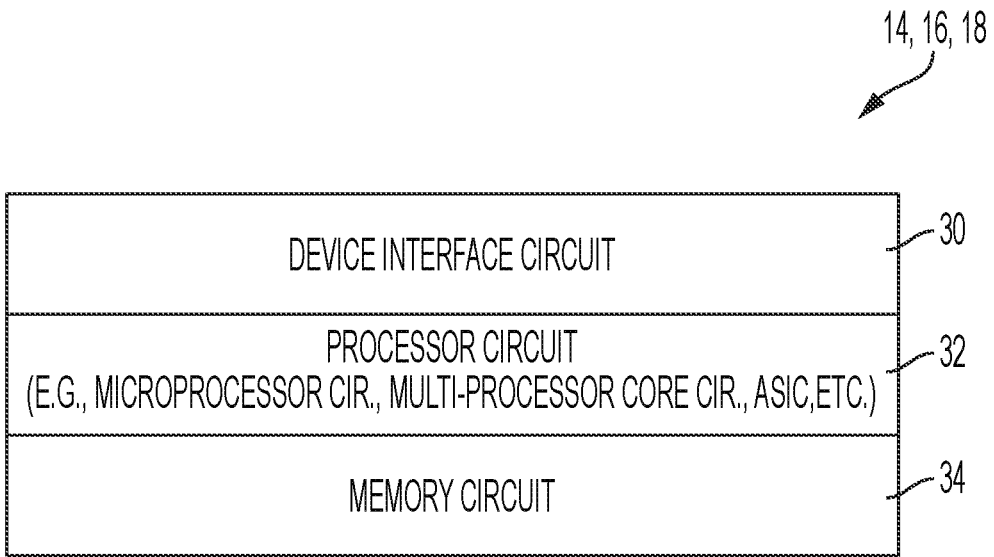
FIG. 7 illustrates an example implementation of any one of the network devices of FIGS. 1, 4, and 5, according to an example embodiment.

The DAG root 16, in response to receiving the DAO messages from the RPL nodes 18, can build the entire nonstoring DODAG topology 12 in accordance with RFC 6550, and store the DAG topology 12 in its memory circuit (34 of FIG. 7).

All the network devices, including the root network device (e.g., "Root 1") 16 and the LLN devices 18, can output a corresponding routing advertisement message (e.g., a DIO message). Further, all the LLN 18 devices can have one or more attachments (illustrated in the Figures as lines in between the network devices), where each attachment is used to illustrate an optimized next-hop path chosen for an identifiable objective function.

Figure 2:
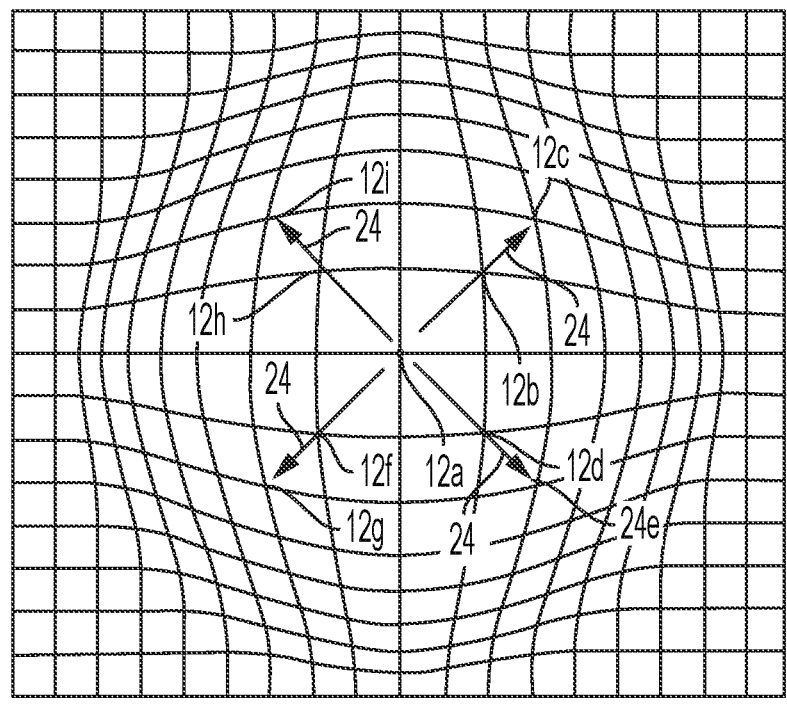
FIG. 2 illustrates migration of network devices from a loaded wireless data network to neighboring wireless data networks, according to an example embodiment.

FIG. 2 illustrates migrating network devices from a loaded PAN to neighboring PANs, according to an example embodiment. The Wi-SUN network 10 can include a plurality of PANs 12, where each PAN 12 is illustrated as an intersecting line. FIG. 2 illustrates a collection of RPL DODAGs (including DODAGs 12a through 12i) as a three-dimensional patchwork having a height in the "z" direction extending from the plane of FIG. 2, the "z" direction representing a corresponding "load" on a given PAN 12. Hence, the "z" direction represents the "load" on a given PAN 12, and the flat X-Y plane of FIG. 2 represents the relative X-Y positions of the PANs 12 in the Wi-SUN network 10. By way of analogy, the "z" direction represents a variable surface of "sand", where the PANs 12 would be evenly load balanced if the grid was uniform (all PANs 12 having an equal height "z"), in other words the PANs 12 would be balanced if the "sand" is flat in FIG. 2.

As illustrated in FIG. 2, the PAN 12a illustrates a peak "mountain in the middle" having a peak loading relative to the neighboring PANs 12b through 12i; in other words, the controller device 14 can determine that PAN 12a has a peak load, the PANs 12b, 12d, 12f, and 12h have a lower load than the PAN 12a, and the PANs 12c, 12e, 12g, and 12i have a lower load than any of the PANs 12b, 12d, 12f, or 12h.

According to example embodiments, the controller device 14 can output selected enrollment priorities 20 (and/or individual attachment directives 70 for specific target devices 18) to the respective roots 16 of each of the PANs 12a through 12i to "press down" the load encountered by the PAN 12a, enabling a migration 24 of IoT devices 18 from the PAN 12a toward the outer PANs 12c, 12e, 12g, and 12i in order to provide a more even distribution of load among the PANs 12 in the Wi-SUN network 10. In other words, the controller device 14 can effectively "press down" the load encountered by the PAN 12a by causing its corresponding border router device 16a to output an enrollment priority (e.g., "P1=200") indicating the undesirability of joining the PAN 12a in order to cause migration of a plurality of IoT devices 18 toward neighboring PANs 12b, 12d, 12f, and 12h; similarly, the controller device 14 can "press down" the load encountered the neighboring PANs 12b, 12d, 12f, and 12h by causing the respective border router devices 16 to output enrollment priorities (e.g., "P2=150") that cause the migration of IoT devices 18 toward the neighboring PANs 12c, 12e, 12g, 12i that can output enrollment priorities (e.g., "P3=100"). A lower enrollment priority value represents a relatively higher desirability for accepting new wireless network devices 18 as member network devices.

Hence, the controller device 14 can output selected enrollment priorities 20 to respective border router devices 16 that advertise, to the IoT devices 18 detecting the DIO messages comprising the enrollment priority 20, the PAN 12a as the least desirable DODAG 12 to join (based on the enrollment priority "P1=200" 20), the PANs 12b, 12d, 12f, and 12h as more desirable than the PAN 12a (based on the enrollment priority "P2=150" 20), and the PANs 12c, 12e, 12g, 12i even more desirable than the PANs 12b, 12d, 12f, and 12h (based on the enrollment priority "P3=100" 20). As described in further detail below, the controller device 14 can control the rate of the migration 24 based on the relative difference between the enrollment priorities 20 to be advertised by respective border router devices 16, for an identified time interval; in other words, a greater migration rate can be accomplished by a greater difference in enrollment priorities 20 between neighboring PANs 12, and a greater overall migration can be accomplished using a greater migration rate and/or a longer identified time interval for advertising the different enrollment priorities 20. Following the migration 24 the controller device 14 can update the enrollment priorities 20 with equal-value enrollment priorities among the PANs 12a through 12i to halt the migration 24. If desired, additional "leaking" (or "low-rate migration") can be executed based on other PANs 12 outside the periphery of the PANs 12a through 12i advertising lower enrollment priorities.

Figure 3A:
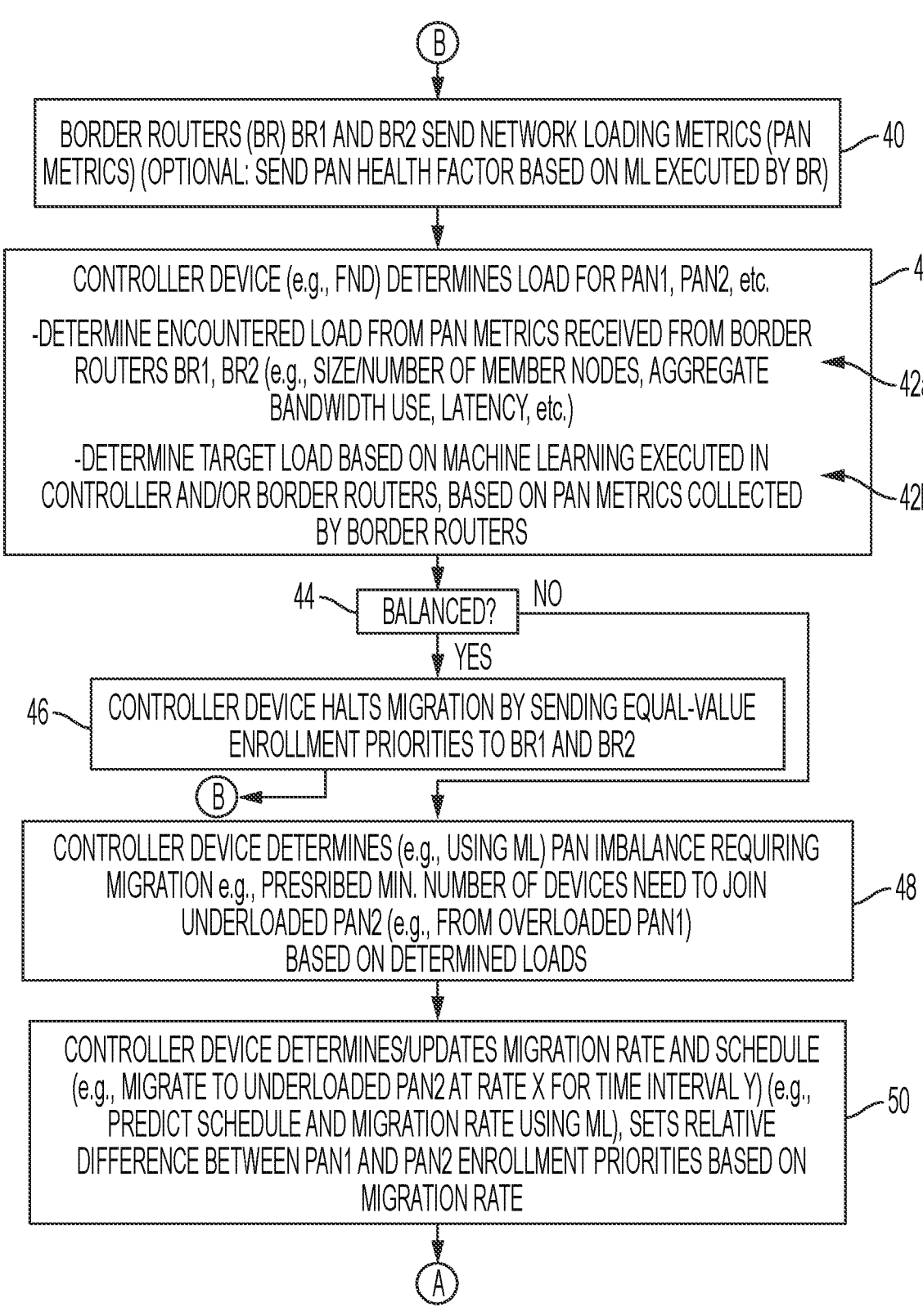

FIGS. 3A-3B illustrate an example method by the controller device 14 of FIG. 1 providing Inter-PAN Load/Size Balancing based on allocating enrollment priorities 20 in LLNs 12, illustrating "broadcast" based rebalancing based on sending different enrollment priorities 20. FIGS. 6A-6C illustrate the controller device causing migration of targeted devices based on identifying load attributes for the wireless network devices, and sending individual attachment directives 70 to the targeted devices, illustrating the "unicast" based rebalancing based on sending individual attachment directives 70 to targeted devices 18.

Referring to FIG. 3A, the processor circuit (32 of FIG. 7) of each border router device 16 of each PAN 12 (e.g., 16a, 16b) in operation 40 can detect network loading metrics for its corresponding PAN 12 (e.g., "PAN1", "PAN2"), and send the network loading metrics to the controller device 14. Example loading metrics can include PAN size/number of member IoT devices 18 attached within the PAN 12, aggregate bandwidth in use in the PAN 12, number of routes in the PAN 12, energy consumed in the PAN 12, latency encountered in the PAN 12, etc. As described below, each PAN 12 in operation 40 can detect one or more network loading metrics based on analytics executed by the processor circuit 32 of a PAN 12, and/or based on various performance metrics originated by one or more of the IoT devices 18 in the corresponding PAN 12.

Each border router device 16 in operation 40 also can execute machine learning (ML) in order to determine a PAN "health factor" (HF) for the corresponding PAN 12. For example, the processor circuit (32 of FIG. 7) of each border router device 16 in operation 40 can determine a health factor using a known metric such as the overall packet loss, average transit time delay, average jitter (or any related statistical quantities such as the wireless transmission medium, ninetieth percentile (90%), etc.). In another embodiment, the PAN HF can be determined based on execution of a polynomial function using one or more metrics (note that such health functions are used by products such as the commercially-available Cisco DNA center for other networking entities such as the mobile device, a switch or a router).

Each border router device 16 in operation 40 also can execute ML operations, including for example a regression function (e.g. using Deep Learning, or Gradient Boosted trees) to compute the PAN HF using a series of input features such as the DODAG number of nodes, overall topology (number of layers, average number of nodes per layer, etc.) physical span of the PAN 12, localization (city vs countryside, etc.), breakout of applications being used in the DODAG mesh (obtained using the commercially-available Cisco Network Based Application Recognition (NBAR) on the DODAG root 12). The Cisco DNA center and the Cisco NBAR are commercially available from Cisco Systems, San Jose, California.

Although the regression function can be executed by the DODAG root 12, any associated training can be executed by the controller device 14 and/or in a cloud-based computing system where more memory, CPU resources are available. In other words, the controller device 14 can execute the machine learning, on behalf of the PANs 12, to determine the corresponding PAN health factor based on received loading metrics. Hence, the processor circuit 32 of the controller device 14 in operation 42 can collect a set of input features (including network loading metrics, PAN HFs) from one or more DODAG roots 16, and determine a load for each of the PANs 12 based on the supplied input features. For example, the processor circuit 32 of the controller device 14 in operation 42a can determine an encountered load by each PAN 12 based on the received network loading metrics and/or PAN HF from the corresponding border router device 16; alternately, the processor circuit 32 of the controller device 14 in operation 42b can determine a target load for a PAN 12 that is determined based on execution of machine learning using the metrics associated with the corresponding PAN 12, including network loading metrics, corresponding PAN HF, etc.

The processor circuit 32 of the controller device 14 in operation 42 also can compute a single regression function that can be shared between all DODAGs 12 in the network 10. Telemetry (e.g., network loading metrics, etc.) can be collected in operation 42 by the controller device 14 upon request, or at regular intervals using actual telemetry or sampled values of the input features retrieved from a border router device 16 and/or one or more selected IoT devices 18; hence, telemetry can be aggregated from IoT devices 18 by a border router device 16 and forwarded to the controller device 14, and/or the telemetry can be retrieved by the controller device 14 from a specific identified IoT device 18, as desired. Hence, a DODAG root 16 can update the PAN HF value on a regular or periodic basis, and/or when a significant change is observed (e.g., an increase/decrease by more than prescribed percentage, etc.).

In yet another embodiment the PAN HF can be computed (e.g., by a border router device 16 in operation 40 and/or the controller device 14 in operation 42) according to node and application characteristics. In mesh or cell network where QoS per Class of Service (CoS) is enabled it becomes possible to load balance according to the CoS. In such a case the regression function can be calculated based on the CoS, thus leading to multiple values of HF, one per CoS.

Hence, a computing device (e.g., the border router device 16 in operation 40 and/or the controller device 14 in operation 42) can maximize objectives, such as number of joined nodes, etc. while maintaining the PAN health factor above a threshold. Based on the learning operations, the border router device 16 in operation 40 and/or the controller device 14 in operation 42b can compute acceptable load values for number of nodes and throughput for each PAN 12, and can compute additional loads that can be added to each PAN 12, as well as the projections of these additional loads in the near future based on experience on the speed at which the loads change.

The border router device 16 in operation 40 and/or the controller device 14 in operation 42 also can execute ML-based longer term analysis to determine the projected value for a PAN HF based on seasonal decomposition using an algorithm such as Prophet or Fourier transform. Hence, the border router device 16 and/or the controller device 14 can determine loads based on trend and seasonality for either the input features (number of clients devices 18, etc.) or the HF (or HF per CoS) itself. Hence, the border router device 16 and/or the controller device 14 can detect a seasonal phenomenon potentially leading to rejecting (or discouraging) a new node to join a cell (or DODAG) 12 if it is expected to see many other nodes joining the cell or DODAG in a near future.

Hence, the controller device 14 in operation 42 computes the target load for each DODAG 12, and decides in operation 44 whether the PANs 12 are balanced in terms of target number of member nodes 18, or where and/or when nodes need to migrate from a high (loaded) DODAG to a lower (least loaded) ones.

If in operation 44 the processor circuit 32 of the controller device 14 determines that the PANs 12 are balanced in terms of load (actual encountered load and/or target loads based on ML-based projections), the processor circuit 32 of the controller device 14 in operation 46 can halt any migration based on setting all enrollment priorities 20 to an equal value, and sending the equal-value enrollment priorities 20 to each of the PANs 12 for advertisement of the equal-value enrollment priorities 20 in respective DIO messages.

If in operation 44 the processor circuit 32 of the controller device 14 determines imbalance in the actual or target loads among the PANs 12, the processor circuit 32 in operation 48 can determine the amount of PAN imbalance that requires migration, including for example determining a prescribed minimum number of IoT devices 18 that need to migrate to an "underloaded" or "underutilized" PAN 12. The migration can be directed to "orphan" (i.e. unattached) nodes 18 that do not yet belong to any PAN 12, or the migration can be directed to "member" nodes that need to migrate from an "overloaded" PAN (e.g., 12a of FIG. 2) to underloaded PANs (e.g., 12b through 12i of FIG. 2).

The processor circuit 32 of the controller device 14 in operation 50 can compute a target load "TLi" for each DODAG "i" and a sequence of "pressures" and duration for each border router device 16, where a "pressure" indicates a migration rate based on a relative difference between enrollment priorities 20 between neighboring PANs 12 for a prescribed duration, also referred to as a migration interval. Hence, the processor circuit 32 of the controller device 14 in operation 48 can compute a scheduled sequence of enrollment priorities 20 for each border router device 16.

Figure 4:
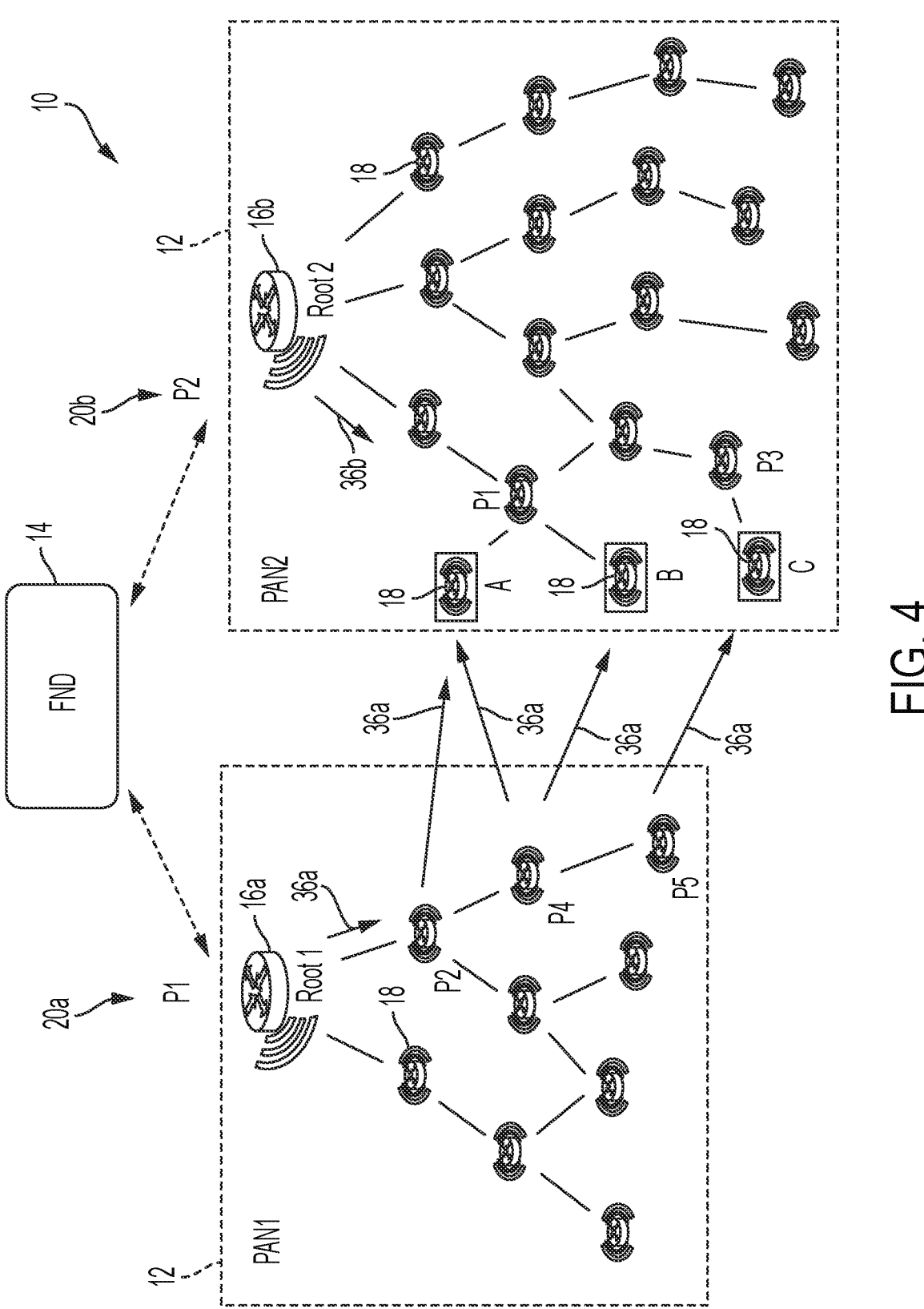
FIG. 4 illustrates wireless network devices in a second wireless data network receiving advertisement messages originated from the first wireless data network, for causing migration to the first wireless data network, according to an example embodiment.

Referring to FIG. 3B and as illustrated in FIG. 1, the controller device 14 in operation 52 can generate and send instructions to each of the border router devices 16 that cause the scheduled sequence of enrollment priorities (e.g., "P1" for "PAN1" 12, "P2" for "PAN2" 12, etc.) 20 to be installed by the border router devices 16 in operation 54. As described below, the instructions generated and sent in operation 52 can include minimum rank requirements that identifies a minimum rank required for migration, preventing an IoT device 18 having a rank less than an advertised minimum rank requirement from migrating from a first wireless data network 12 to a second wireless data network 12 during the current migration interval. As illustrated in FIG. 4, the controller device 14 can generate and output to the border router device 16a in operation 52 a corresponding allocated enrollment priority "P1" 20a; the controller device 14 also can generate and output to the border router device 16b in operation 52 a corresponding allocated enrollment priority "P2" 20b.

Each border router device 16 in operation 54 can receive the instructions, including the corresponding enrollment priority 20 and associated policies including deployment rules (e.g., a time and duration of a migration interval for advertising the specified enrollment priority 20). Hence, each border router device 16 in operation 56 can generate and output, within its corresponding PAN 12, a DIO message (and/or link layer beacon message, as appropriate) that specifies the allocated enrollment priority 20 according to the deployment rules (e.g., migration time interval duration/schedule, etc.) set by the controller device 14.

As described in the copending application Ser. No. 17/671,712, IoT devices 18 within a "border area" are within transmission range of both the "PAN1" 12 and the "PAN2" 12: if security does not permit receiving DIO messages from a neighboring PAN, IoT devices attached in one PAN (e.g., "PAN2") can obtain the enrollment priority "P1" 20a from link layer beacons. Hence, each IoT device 18 in the border area between PANs can select whether to join the "PAN1" 12 or the "PAN2" 12 based on received DIO/beacon messages 36a and 36b initiated by the border router devices 16a and 16b, respectively. Hence, as illustrated in FIG. 4, the DIO message/beacon message 36a initiated and output by the border router device 16a can be propagated throughout the "PAN1" 12 by the attached IoT devices 18, enabling the neighboring IoT devices 18 in the neighboring "PAN2" 12 to detect the DIO message/beacon message 36a initiated by the border router device 16a.

The DIO/beacon messages 36a output by the border router device 16a in operation 56 and specifying the enrollment priority "P1" 20a can cause attached IoT devices "A", "B", and "C" 18 in the "PAN2" 12 to compare the enrollment priority "P1" 20a advertised by the border router device 16a with the enrollment priority "P2" 20b advertised in the DIO/beacon message 36b generated and output by the border router device 16b.

Figure 5:
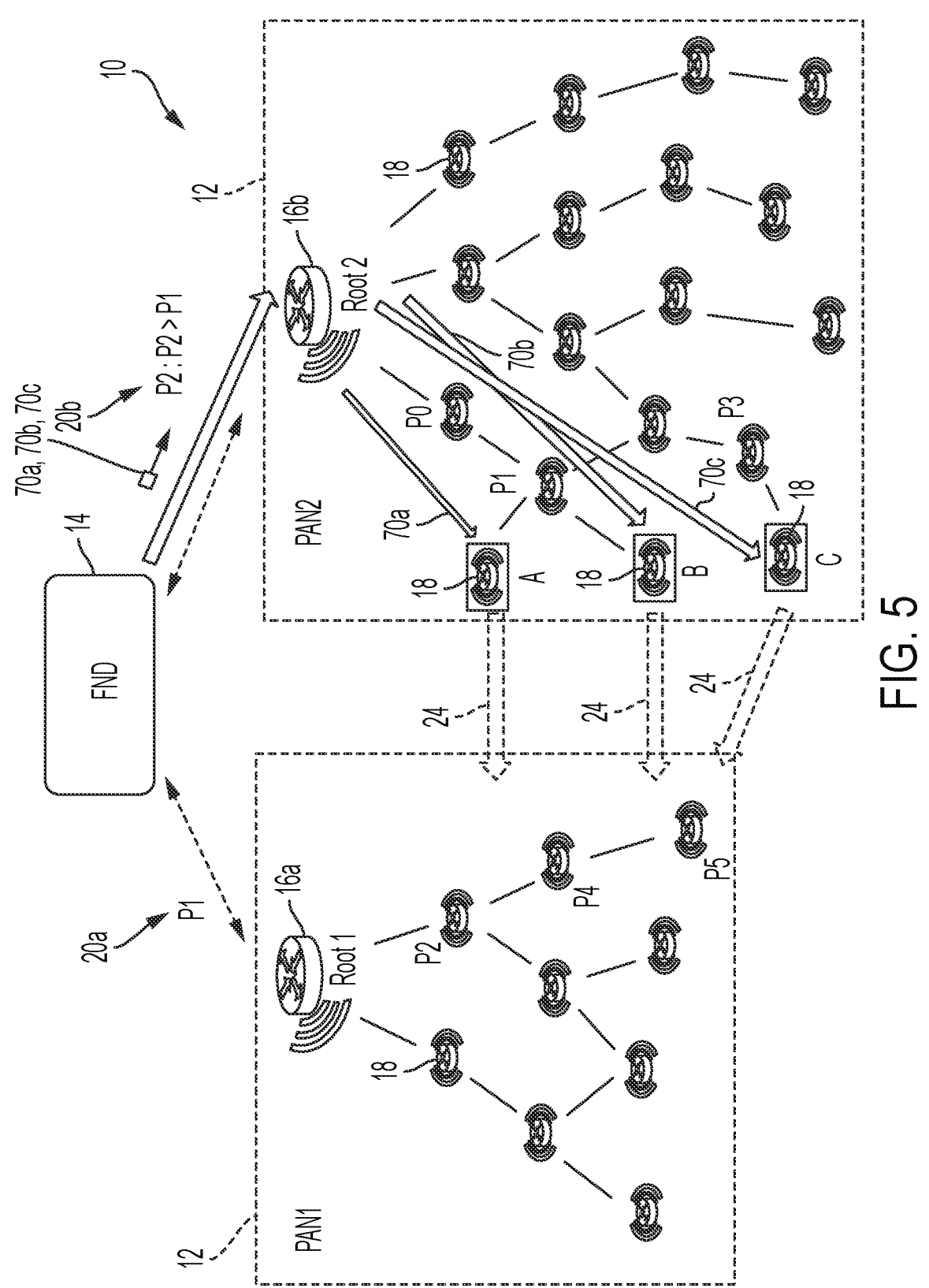
FIG. 5 illustrates the controller device causing migration by targeted network devices from the second wireless data network to different identified parent network devices in the first wireless data network, according to an example embodiment.

As illustrated in FIG. 5, the attached IoT devices "A", "B", and "C" 18 in operation 58 can determine that the enrollment priority "P1" 20a advertised by the border router device 16a is less than the enrollment priority "P2" 20b advertised by the border router device 16b, causing the IoT devices "A", "B", and "C" 18 to migrate (operation 24 of FIG. 5) from the "PAN2" 12 to the "PAN1" 12. If the DIO/beacon message 36a also specifies a minimum rank requirement, then the IoT devices "A", "B", and "C" 18 attached in the "PAN2" 12 can selectively migrate in operation 24 to the "PAN1" 12 based on determining their respective ranks in the "PAN2" 12 are greater than or equal to the minimum rank requirement. Hence, if the minimum rank requirement is "MIN RANK=200" and the IoT devices "A", "B", and "C" 18 have ranks "RANK A=150", "RANK B=225", and "RANK C=275" in the "PAN2" 12, the IoT devices "B" and "C" can determine that they can execute migration 24 to the "PAN1" 12, whereas the IoT device "A" 18 cannot migrate during the current migration interval based on determining its rank is less than the minimum rank requirement, i.e., "RANK A<MIN RANK".

Use of the minimum rank requirement enables the controller device 14 to manage migration operations 24 to ensure that higher-rank IoT devices (further from a border router device 16b) migrate before any lower-rank IoT devices that are closer to the border router device 16b, ensuring no disruption in network topology for existing IoT devices relying on a parent IoT device to remain attached within the same network. The controller device 14 can cause lower-rank IoT devices (closer to the border router device 16b) to migrate during a later migration interval, illustrated below.

If in operation 60 each border router device 16 has determined that the current advertisement time interval for the allocated enrollment priority 20 (i.e., migration interval) has expired, the border router device 16 in operation 62 can optionally halt transmission of the allocated enrollment priority 20 and report updated load metrics to the controller device 14. Alternately, each border router device 16 can output updated load metrics (and/or PAN HF values) to the controller device 14, and at the end of the first advertisement interval at operation 60 each border router device 16 can initiate scheduled advertisement in operation 56 of the next scheduled enrollment priority 20. The controller device 14 also can cause the border router devices 16 to update the minimum rank requirement to a lower value for the next migration interval, enabling the IoT devices (e.g., "A") closer to the border router device 16b to migrate to the "PAN1" 12.

Similarly, orphaned (or unattached) IoT devices can selectively execute migration 24 in operation 58 based on detecting different enrollment priorities 20. As described in copending application Ser. No. 17/671,712, the controller device 14 can output initial enrollment priorities 20a and 20b having equal values "P1=P2=50", which normally would cause orphan nodes to randomly select the "PAN1" or the "PAN2" 12.

A change in the enrollment priority 20b by the controller device 14 to the updated value "P2=60" can cause the border router device 16b to output updated DIO/beacon messages 36 with the updated value, causing the orphan IoT devices to migrate (24 of FIG. 5) toward the border router device 16a (or an attached IoT device 18 within the associated "PAN1" 12) that is advertising a "preferred" enrollment priority "P1=50" 20a that is less than the updated enrollment priority "P2=60". The controller device 14 can cause an update in the enrollment priorities to ensure even balancing between the "PAN1" 12 and the "PAN2" 12, for example based on updating the enrollment priority "P1" 20a to the updated enrollment priority "P1=60" that equals the updated enrollment priority "P2=60", effectively halting the "pressure" for IoT devices to migrate toward a PAN 12.

Hence, regular or constant feedback by the border router device 16 enables the controller device 14 to adjust the schedule and/or migration rate depending detecting a higher or lower migration rate between the PANs 12. Hence, the controller device 14 can learn the responsiveness in migration between different PANs 12, and can thus adjust and improve the relative differences in enrollment priorities 20 for the next scheduled migration interval. As described previously, the relative difference between the values of the enrollment priorities 20 enables the IoT devices 18 to determine the relative "aggressiveness" of the migration 24, i.e., the relative migration rate induced by the controller device 14.

Hence, the controller device 14 can initially set the initial enrollment priorities 20a and 20b to a base (minimum) value of "P1=P2=50" for each PAN 12 in the Wi-SUN network 10, causing each border router device 16 to output a DIO/beacon message 36 with the base enrollment priority value of "Pi=50". Hence, IoT devices 18 can begin joining a PAN 12, causing the controller device 14 to periodically collect in operation 42 the size (i.e. number of nodes) of all PANs 12.

If in operation 44 of FIG. 3A the FND detects the size of two/multiple neighboring PAN are very different, and their differences exceed a threshold (indicating unbalanced PANs 12), the controller device 14 in operation 48 and 50 can adjust the enrollment priority 20 of these PANs, and send to the border router device 16b the updated enrollment priority "P2=60" in operation 52. The FND 14 can provide a larger EP value to the "PAN2" having a larger number of member nodes, so that new joining nodes (i.e., the orphan nodes) will more likely choose the smaller-size "PAN1" over the larger-size "PAN2". In other words, a joining node can respond to receiving DIOs from PAN1 with EP=50 and PAN2 with EP=60 by more likely joining "PAN1" in operation 58 of FIG. 3B.

Hence, the relative size of PANs 12 can gradually become balanced, as reported by the border router devices 16 to the controller device 14 in operation 40 of FIG. 3A. In response to the FND 14 detecting in operation 42 the sizes of two/multiple neighboring PANs are comparable, the controller device 14 in operation 44 can determine the neighboring PANs 12 are balanced, and in response adjust in operation 46 the enrollment priorities again to halt migration 24, for example, based on setting the enrollment priority "P1" for the "PAN1" 12 and the enrollment priority "P2" to equal "P1=P2=60".

The above PAN balancing mechanism can be executed dynamically, so that joined nodes might be able to migrate to a neighbor PAN with less nodes.

As described previously, the IETF draft by Richardson et al. describes a RPL DIO option that can be used to announce an enrollment min priority, which expresses (when increasing) a decreasing willingness by the RPL DODAG globally to accept new joins. However the IETF draft by Richardson et al. does not explain how the root computes enrollment min priority, and the IETF draft by Richardson et al. does not mention how to the enrollment min priority could be used for PAN rebalancing.

Hence, an FND 14 can set the value at each root network device to achieve a globally optimized balance. The FND can respond to detected changes in load (e.g., size, throughput, etc.) by different PANs based on the FND scheduling selected values of min priority values for selected root network devices for selected durations in a selected sequence. Hence, the FND can effectively exert "pressure" on different PANs based on changing a relative difference of enrollment priorities that can cause IoT device to migrate to a PAN advertising a relatively smaller enrollment priority.

FIG. 5 illustrates the controller device causing migration 24 by targeted network devices from the second wireless data network to different identified parent network devices the first wireless data network based on the FND 14 sending individual attachment directives 70 to respective target network devices "A", "B", and "C" 18, according to an example embodiment.

FIGS. 6A-6C illustrates the controller device causing migration of targeted devices based on identifying load attributes for the wireless network devices, and sending individual attachment directives to the targeted devices, according to an example embodiment.

As described previously, the controller device 14 can be configured for executing "unicast-based optimization" or "unicast-based rebalancing" of the PANs (e.g., "PAN1", "PAN2", etc.) 12 based on generating and outputting, for unicast transmission by a root network device 16, an individual attachment directive (70 of FIG. 5) that causes a targeted device (e.g., "A") 18 to migrate based on detaching from its identified parent network device (e.g., "P1" of FIG. 5) and attach to a different parent network device (e.g., "P2" of FIG. 5) identified in the individual attachment directive 70.

Referring to FIG. 6A, the processor circuit 32 of each IoT device 18 in operation 72 can attach to one or more parent network devices (e.g., "P1", through "P5", etc.) in response to detection of advertisement messages (e.g., DIO messages, beacon messages, etc.) 36a, 36b from the respective root network devices 16a, 16b. As illustrated in FIG. 5, the IoT device "A" 18 in operation 72 can attach to the parent network device "P1" of "PAN2" 12 in response to receiving an advertisement message (e.g., DIO message/beacon message) 36b originated by the root network device "Root2" 16b. The DIO message 36b identifies the PAN "PAN2" 12, for example based on DODAG ID of the "PAN2" 12 (e.g., the IPv6 address of the root network device "Root2" 16b).

Although not shown in FIG. 5, the IoT device "A" 18 also can attach to more than one parent network device according to RFC 6550.

The processor circuit 32 of the IoT device "A" 18 in operation 74 can detect neighboring network devices based on detected messages, including advertisement messages (e.g., DIO/beacon messages) 36, DAO messages, DIS messages according to RFC 6550, etc. The processor circuit 32 of the IoT device "A" 18 in operation 74 also can learn of neighboring network devices (e.g., related neighboring network devices or unrelated neighboring network devices that belong to a different PAN 12) based on detecting a Sibling Information Option of an advertisement message described, for example, in section 5.4 of the IETF Draft by Thubert et al., entitled "Root initiated routing state in RPL" (describing use of a DODAG ID specified in a Sibling Information Option of a DAO message). Hence, the processor circuit 32 of the IoT device "A" 18 in operation 74 can detect peer/sibling network device (e.g., "B" 18) attached to the same parent network device "P1" 18, based on detecting a DAO message output by the peer/sibling network device (e.g., "B") outputting a unicast DAO message addressed to the same parent network device "P1"; the processor circuit 32 of the IoT device "A" 18 in operation 74 can execute identification of the neighboring network device "P2" (and/ or "P4 or "P6", etc.) in response to detecting a DIO message 36a that identifies the neighboring network device "P2" and the different "PAN1" 12, for example based on DODAG ID of the "PAN1" 12 (e.g., the IPv6 address of the root network device "Root1" 16a). Hence, the processor circuit 32 of the IoT device "A" 18 in operation 74 can determine whether a neighboring network device is in the same PAN (e.g., "PAN2") 12 or a different PAN (e.g., "PAN1") 12 based on the PAN ID/DODAG Id specified in the detected message output by the neighboring network device 18.

The processor circuit 32 of the IoT device "A" 18 in operation 76 can detect load attributes encountered during its attachment to the parent network device "P1" in the "PAN2" 12. Example load attributes can include the utilized bandwidth (e.g., transmissions and/or unicast receptions by the IoT device "A" 18), number of attached children network devices, traffic load from each attached child network device, the number of peer/sibling devices sharing the parent network device "P1" (i.e., attached to the same parent network device "P1"), number of neighboring network devices 18 that are not attached to the same parent network device "P1" (e.g., neighboring network device "C" attached to parent network device "P3" in the "PAN2" 12; neighboring network device "P2" or "P4" in the "PAN1" 12). The load attributes detected in operation 76 also can include the density of wireless network traffic detected by the IoT device "A" 18.

The processor circuit 32 of the IoT device "A" 18 in operation 78 can generate and output, to its parent network device "P1" 18, a load attributes message that specifies each of the load attributes detected in operation 74, and the status of each neighboring network device "B", "P2", "P4", etc. As described previously, each parent network device (e.g., the parent network device "P1" 18) can forward a data packet to its default parent, enabling the root network device "Root2" 16b to receive in operation 80 the load attribute messages from each of the network devices 18 in its "PAN2" 12.

The processor circuit 32 of the root network device "Root2" 16b in operation 80 can respond to reception of the load attribute messages by generating and sending, to the controller device 14, a network topology and loading status message. The network topology and loading status message can identify the load attributes and neighbor status for each child network device (as reported by that child network device). The network topology and loading status message also can include the PAN-wide network loading metrics as described previously with respect to operation 40 in FIG. 3A. The processor circuit 32 of the root network device "Root2" 16b alternately can send individual load attributes messages, for example based on updated load attributes received from a child network device within the "PAN2" 12.

Hence, the controller device 14 can receive in operation 82 the network topology and loading status messages from the root network devices "Root1" 16a and "Root2" 16b describing the network topology and loading for each of the child network devices in the PANs "PAN1" and "PAN2" 12, respectively, including the information as described previously with respect to operations 40 and 42 of FIG. 3A.

Referring to FIG. 6B, the processor circuit 32 of the controller device 14 in operation 84 can determine the load attributes for respective wireless network devices in any one or more PANs 12 in the data network 10, where the controller device 14 can determine the load attribute for each IoT device 18 (e.g., the IoT device "A" 18) relative to its neighboring network devices 18 that can be within the same PAN (e.g., "PAN2") 12 or a different PAN (e.g., "PAN1") 12. For example, the processor circuit 32 of the controller device 14 in operation 84a can determine, among the load attributes for each IoT device (e.g., "A") 18, its bandwidth utilization (tracked over time since attachment to the same or different parent network devices), its current parent network device(s) (e.g., "P1"), the number of child network devices attached to the IoT device, the traffic load from each child network device, number of sibling network devices attached to the same parent network device, number of related neighboring network devices sharing a same non-root common parent network device within the same PAN, number of unrelated neighbors in a different PAN (such as "PAN1"), density of wireless network traffic encountered by the IoT device (e.g., "A"), etc.

As described previously (e.g., with respect to operation 40), the processor circuit 32 of the controller device 14 in operation 84b also can execute machine learning to identify trends and projected loads based on the network loading metrics, including a current and projected health factor (HF) for a specific IoT device (e.g., "A") based on its current parent (e.g., "P1"), relative to other potential parent devices among its neighboring network devices within the same PAN 12 or a different neighboring PAN 12, including for example historical trend analysis and predicted load analytics.

Hence, the processor circuit 32 of the controller device 14 in operation 86 can identify a target load, or "pressure", for each network device 18 based on the determined load attributes, projected health factors for the network device 18 relative to candidate parent network devices for at least an identified future time interval. Hence, the processor circuit 32 of the controller device 14 in operation 86 can establish a sequence of loads or "pressures" for each identified "targeted" network device (e.g., "A"), relative to its current parent network device (e.g., "P1") and other potential network devices (e.g., "P2", "P3", "P4", "P5") for schedule durations selected by the controller device 14.

The processor circuit 32 of the controller device 14 in operation 88 can determine, based on the load attributes and target loads, that at least one targeted IoT device "A" 18 needs to migrate to a different parent network device (e.g., "P2") 18 for at least an identified duration. The controller device 14 in operation 88, as part of determining the targeted IoT device "A" 18 needs to migrate, can establish a migration plan for moving different IoT devices 18 to different parent network devices 18 according to a determined migration schedule relative to scheduled loads ("load schedule") for the respective target network devices.

For example, the processor circuit 32 of the controller device 14 in operation 88 can determine that the IoT device "A" 18 needs to migrate from the parent network device "P1" 18 in "PAN2" 12 to a different parent network device "P2" 18 in "PAN1" 12 for at least an identified time interval "T1" (e.g., starting at time "t=T1" and having a prescribed time interval set and specified by the controller device 14, for example one hour) that can be identified according to a migration schedule and a load schedule. The controller device 14 in operation 88 also can determine that the IoT device "B" 18 needs to migrate from the parent network device "P1" 18 in "PAN2" 12 to a different parent network device "P5" 18 in "PAN2" for at least an identified time interval "T2" (e.g., starting at time "t=T2"); the controller device 14 in operation 88 also can determine that the IoT device "A" 18 needs to migrate from the parent network device "P2" 18 to a different parent network device "P4" 18 for at least an identified time interval "T4" (e.g., starting at time "t=T4"). The controller device 14 also can determine that the IoT device "C" 18 needs to move from the parent network device "P3" 18 to the parent network device "P5" 18, for example at the identified time interval "P3".

Hence, the processor circuit 32 of the controller device 14 in operation 90 can generate and output individual attachment directives 70a, 70b, and 70c for the targeted IoT devices "A", "B", and "C" 18, respectively. Each individual attachment directive 70 identifies an identified network device 18 as an intended "targeted device" for executing a migration operation 24 to an identified different parent network device identified in the individual attachment directive 70; the individual attachment directive 70 also can specify timing information that causes the targeted device (e.g., the IoT device "A" 18) to detach from its current parent network device (e.g., the parent network device "P1" 18) and attach to the identified different parent network device (e.g., the parent network device "P2" 18") by a prescribed time instance (e.g., by the time instance "t=T2"). As illustrated in FIG. 5, the controller device 14 can output the individual attachment directives 70a, 70b, and 70c for unicast forwarding by the border router device "Root2" 16b in operation 92 according to the routing topology maintained by the border router device "Root2" 16b (e.g., via a corresponding source-route path in a non-storing mode DODAG, or via an identified next-hop network device "P0" in a storing mode DODAG).

Referring to FIG. 6C, each targeted device (e.g., "A", "B", "C") 18 can respond to receiving its associated individual attachment directive 70 (e.g., 70a, 70b, 70c) by executing in operation 94 a migration operation (24 of FIG. 5), including detaching from its current parent network device and attaching to a different parent network device identified in the individual attachment directive 70. As illustrated in FIG. 5 and FIG. 6C, the individual attachment directive 70a can cause the IoT device "A" 18 to detach from its current parent network device "P1" 18 and attach to the parent network device "P2" 18 by the beginning of the time interval "T1" for optimized operations by the IoT device "A" 18 starting at the time interval "T1" (the individual attachment directive 70a also can specify another instruction causing the IoT device "A" 18 to detach from an existing parent network device and attach to a specified second parent network device "P4" 18 by the time interval "P4", according to the schedule determined in operation 88); the individual attachment directive 70b can cause the IoT device "B" 18 to detach from its current parent network device "P1" 18 and attach to the parent network device "P5" 18 by the beginning of the time interval "T2"; the individual attachment directive 70c can cause the IoT device "C" 18 to detach from the parent network device "P3" 18 and attach to the parent network device "P5" 18 by the beginning of the identified time interval "P3".

Hence, a targeted device (e.g., "A", "B", "C") 18 following migration to its new parent network device can resume generating and outputting in operation 96 updated load attributes describing updated network loading, and updated attributes of neighboring devices, relative to its attachment to the new parent network device. As described previously with respect to operation 80 in FIG. 6A, the updated load attributes can be forwarded by the current root network device 16 to the controller device 14 for updating of the load attributes of the targeted device 18 relative to its updated parent network device. The updated load attributes thus enable the controller device 14 to continually execute inter-PAN optimization among the PANs based on the updated metrics from the IoT devices.

According to example embodiments, a controller device 14 can execute inter-network optimization based on generating and sending individual attachment directives to targeted devices via root network devices of the respective wireless data networks. The example embodiments enable inter-PAN optimization on a per-network device basis, enabling proactive and/or ad-hoc optimization in response to determined future events or in response to a dynamic change in network loading (e.g., in response to an IoT device initiating video transmission of a local fire). Hence, the example embodiments enable dynamic rebalancing in response to targeted loading or unexpected load requirements.

As apparent from the foregoing, the example embodiments can be applied among multiple PANs 12 as illustrated in FIG. 2, enabling "broadcast" based migration or "unicast" based migration to any of the PANs 12 of FIG. 2 (e.g., from PAN 12a to any of PANs 12b, 12d, 12f, 12h, etc.). In addition, the example embodiments enable different weights and schedules to be applied to any of PANs as desired for rebalancing.

FIG. 7 illustrates an example implementation of any one of the devices 14, 16, and/or 18 in any of the Figures, according to an example embodiment. Each apparatus 14, 16, and/or 18 is a physical machine (i.e., a hardware device) configured for implementing network communications with other physical machines 14, 16, and/or 18 via the physical data network shown in the Figures. The term "configured for" or "configured to" as used herein with respect to a specified operation refers to a device and/or machine that is physically constructed and arranged to perform the specified operation.

Each apparatus 14, 16, and/or 18 can include a device interface circuit 30, a processor circuit 32, and a memory circuit 34. The device interface circuit 30 can include one or more distinct physical layer transceivers for communication with any one of the other devices 14, 16, and/or 18; for example, the device interface circuit 30 can include an IEEE 802.15.4e transceiver for wireless deterministic network communications, for example based on sending and receiving data packets via a wireless data link according to a prescribed wireless data link protocol. The processor circuit 32 can be configured for executing any of the operations described herein, and the memory circuit 34 can be configured for storing any data or data packets as described herein.

Any of the disclosed circuits of the devices 14, 16, and/or 18 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc..

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

determining, by a controller device, load attributes for wireless network devices in a data network comprising at least a first wireless data network rooted by a first root network device, each wireless network device attached to at least an identified parent network device;

identifying, by the controller device based on at least a subset of the load attributes, one or more targeted devices among the wireless network devices for migration to one or more different parent network devices in the data network;

setting, by the controller device, a migration plan for the one or more targeted devices including timing for respective migration based on the load attributes;

generating, by the controller device, individual directives for the one or more targeted devices to each perform detachment from their respective current parent network device and attachment respective parent network device of the one or more parent network devices according to the migration plan;

determining, by the controller device and after at least a subset of the one or more targeted devices have migrated, updated load attributes in the data network; and updating, by the controller device, the migration plan based on the updated load attributes to update timing or sequencing for further migrations.

2. The method of claim 1, wherein determining the load attributes includes determining, among the load attributes for an identified wireless network device, one or more of bandwidth utilized by the identified wireless network device, a number of child network devices attached to the identified wireless network device, a traffic load from each of the child network devices, a number of sibling devices sharing the identified parent network device with the identified wireless network device, or a density of wireless network traffic detected by the identified wireless network device.

3. The method of claim 2, wherein the load attributes is based on a message from the first root network device, the message specifying the load attributes for at least a subset of the wireless network devices reachable via the first root network device.

4. The method of claim 1, wherein the identifying includes:

determining a target load for the one or more targeted devices for at least an identified duration; and setting the migration plan for migrating the one or more targeted devices according to the target load for at least the identified duration.

5. The method of claim 4, wherein:

the one or more targeted devices comprise a plurality of targeted devices to migrate according to a determined schedule, each of the plurality of targeted devices having a corresponding determined target load for a corresponding identified duration relative to the determined schedule.

6. The method of claim 5, further comprising:

adjusting a transmission time for at least a subset of the individual directives.

7. The method of claim 1, wherein:

the data network comprises a second wireless data network rooted by a second root network device; and the individual directives cause at least a subset of the one or more targeted devices to detach from its current parent network device in the first wireless data network and attach to the respective new parent network device in the second wireless data network.

8. The method of claim 7, wherein:

the load attributes are determined based on network loading metrics associated with the first and second wireless data networks and received from the first and second root network devices, respectively;

the identifying including determining a target load based on execution of machine learning using the network loading metrics.

9. One or more non-transitory tangible media encoded with logic for execution by a machine and when executed by the machine operable for:

determining, by the machine implemented as a controller device, load attributes for wireless network devices in a data network comprising at least a first wireless data network rooted by a first root network device, each wireless network device attached to at least an identified parent network device;

identifying, based on at least a subset of the load attributes, one or more targeted devices among the wireless network devices for migration to one or more different parent network devices in the data network;

setting a migration plan for the one or more targeted devices including timing for respective migration based on the load attributes;

generating individual directives for the one or more targeted devices to each perform detachment from their respective current parent network device and attachment to a respective new parent network device of the one or more different parent network devices according to the migration plan;

determining, after at least a subset of the one or more targeted devices have migrated, updated load attributes in the data network; and updating the migration plan based on the updated load attributes to update timing or sequencing for further migrations.

10. The one or more non-transitory tangible media of claim 9, wherein determining the load attributes includes determining, among the load attributes for an identified wireless network device, one or more of bandwidth utilized by the identified wireless network device, a number of child network devices attached to the identified wireless network device, a traffic load from each of the child network devices, a number of sibling devices sharing the identified parent network device with the identified wireless network device, or a density of wireless network traffic detected by the identified wireless network device.

11. The one or more non-transitory tangible media of claim 10, wherein the load attributes is based on a message from the first root network device, the message specifying the load attributes for at least a subset of the wireless network devices reachable via the first root network device.

12. The one or more non-transitory tangible media of claim 9, wherein identifying includes:

determining a target load for the one or more targeted devices for at least an identified duration; and setting the migration plan for migrating the one or more targeted devices according to the target load for at least the identified duration.

13. The one or more non-transitory tangible media of claim 12, wherein:

the one or more target devices comprise a plurality of targeted devices to migrate according to a determined schedule, each of the plurality of targeted devices having a corresponding determined target load for a corresponding identified duration relative to the determined schedule.

14. The one or more non-transitory tangible media of claim 13, further operable for:

adjusting a transmission time for at least a subset of the individual directives.

15. The one or more non-transitory tangible media of claim 9, wherein:

the data network comprises a second wireless data network rooted by a second root network device; and the individual directives cause at least a subset of the one or more targeted devices to detach from its current parent network device in the first wireless data network and attach to the respective new parent network device in the second wireless data network.

16. The one or more non-transitory tangible media of claim 15, wherein:

the load attributes are determined based on network loading metrics associated with the first and second wireless data networks and received from the first and second root network devices, respectively;

the identifying including determining a target load based on execution of machine learning using the network loading metrics.

17. An apparatus implemented as a physical machine, the apparatus comprising:

non-transitory machine readable media configured for storing executable machine readable code;

a device interface circuit; and a processor circuit configured for executing the machine readable code, and when executing the machine readable code operable for:

determining, by the apparatus implemented as a controller device, load attributes for wireless network devices in a data network comprising at least a first wireless data network rooted by a first root network device, each wireless network device attached to at least an identified parent network device, identifying, based on at least a subset of the load attributes, one or more targeted devices among the wireless network devices for migration to one or more different parent network devices in the data network, setting a migration plan for the one or more targeted devices including timing for respective migration based on the load attributes;

generating individual directives for the one or more targeted devices to each perform detachment from their respective current parent network device and attachment to a respective new parent network device of the one or more different parent network devices according to the migration plan;

determining, after at least a subset of the one or more targeted devices have migrated, updated load attributes in the data network; and updating the migration plan based on the updated load attributes to update timing or sequencing for further migrations.

18. The apparatus as in claim 17, wherein determining the load attributes includes determining, among the load attributes for an identified wireless network device, one or more of bandwidth utilized by the identified wireless network device, a number of child network devices attached to the identified wireless network device, a traffic load from each of the child network devices, a number of sibling devices sharing the identified parent network device with the identified wireless network device, or a density of wireless network traffic detected by the identified wireless network device.

19. The apparatus as in claim 18, wherein the load attributes is based on a message from the first root network device, the message specifying the load attributes for at least a subset of the wireless network devices reachable via the first root network device.

20. The apparatus as in claim 17, wherein the identifying includes:

determining a target load for the one or more targeted devices for at least an identified duration; and setting the migration plan for migrating the one or more targeted devices according to the target load for at least the identified duration.

* * * * *